United States Patent
Rousseau et al.

(10) Patent No.: US 6,268,495 B1
(45) Date of Patent: Jul. 31, 2001

(54) COMPOUNDS USEFUL AS RESIN ADDITIVES

(75) Inventors: Alan D. Rousseau; Marvin E. Jones, both of Stillwater, MN (US); Seyed A. Angadjivand, Darlington (GB)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/224,964

(22) Filed: Jan. 4, 1999

Related U.S. Application Data

(62) Division of application No. 08/982,687, filed on Dec. 2, 1997, which is a division of application No. 08/514,866, filed on Aug. 14, 1995.

(51) Int. Cl.$^7$ .................................................. C07D 251/00
(52) U.S. Cl. ............................................. 544/197; 428/198
(58) Field of Search ...................... 548/451, 455; 264/344, 340; 428/198, 224, 296; 544/197

(56) References Cited

U.S. PATENT DOCUMENTS

| | | | |
|---|---|---|---|
| Re. 30,782 | 10/1981 | Van Turnhout | 264/22 |
| Re. 32,171 | 6/1986 | Van Turnhout | 55/155 |
| Re. 35,062 | 10/1995 | Brostrom | 128/206.12 |
| 3,094,547 | 6/1963 | Heine | 260/461 |
| 3,485,705 | 12/1969 | Evans | 161/72 |
| 3,493,462 | 2/1970 | Bunting, Jr. et al. | 161/169 |
| 3,519,603 | 7/1970 | Lohse et al. | 260/47 |
| 3,817,958 | 6/1974 | Moyer | 260/86.7 |
| 3,971,373 | 7/1976 | Braun | 128/146.2 |
| 3,998,916 | 12/1976 | van Turnhout | 264/22 |
| 4,086,499 | 4/1978 | Mishra | 307/88 |
| 4,100,324 | 7/1978 | Anderson et al. | 428/288 |
| 4,118,531 | 10/1978 | Hauser | 428/224 |
| 4,188,690 | 2/1980 | Suzuki et al. | 28/103 |
| 4,215,682 | 8/1980 | Kubik et al. | 128/205.29 |
| 4,288,584 | 9/1981 | Mishra | 526/348.4 |
| 4,297,492 | 10/1981 | Rasberger et al. | 544/211 |
| 4,429,001 | 1/1984 | Kolpin et al. | 428/283 |
| 4,429,791 | 2/1984 | Ruppel et al. | 206/454 |
| 4,492,791 | 1/1985 | Orban et al. | 544/198 |
| 4,536,440 | 8/1985 | Berg | 428/284 |
| 4,588,537 | 5/1986 | Klaase et al. | 264/22 |
| 4,652,282 | 3/1987 | Ohmori et al. | 55/155 |
| 4,701,237 | 10/1987 | Lassen | 156/252 |
| 4,722,806 | 2/1988 | Lai et al. | 252/403 |
| 4,789,504 | 12/1988 | Ohmori et al. | 264/22 |
| 5,057,710 | 10/1991 | Nishiura et al. | 307/400 |
| 5,099,026 | 3/1992 | Crater et al. | 548/229 |
| 5,112,677 | 5/1992 | Tani et al. | 428/240 |
| 5,145,727 | 9/1992 | Potts et al. | 428/198 |
| 5,260,360 | 11/1993 | Mrozinski et al. | 524/95 |
| 5,304,227 | 4/1994 | Matsuura et al. | 55/524 |
| 5,496,507 | 3/1996 | Angadjivand et al. | 264/423 |
| 5,525,397 | 6/1996 | Shizuno et al. | 428/138 |

FOREIGN PATENT DOCUMENTS

| | | | |
|---|---|---|---|
| 0 616 831 A1 | 9/1994 | (EP) | B01D/39/16 |
| 55-53410 | 4/1980 | (JP) . | |
| 5-83283 | 11/1993 | (JP) . | |
| WO 95/05501 | 2/1995 | (WO) | D04H/1/46 |
| WO 96/26783 | 9/1996 | (WO) | B01D/39/08 |

OTHER PUBLICATIONS

Wente, Van A., et al., Report No. 4364 of the Naval Research Laboratories, published May 25, 1954 entitled *Manufacture of Super Fine Organic Fibers*.

Wente, Van A., et al., "Superfine Thermoplastic Fibers", *Industrial Engineering Chemistry*, vol. 48, pp. 1342–1346.

Davis, C.N., "The Separation of Airborne Dust and Particles," *Institution of Mechanical Engineers*, London, Proceedings 1B, 1952.

CA111:40910, Ohara et al., *Thermoplastic Resin Compositions Containing Aromatic Tetracarboxydiimide Plasticizers* (1996).

Primary Examiner—Peter D. Mulcahy
(74) Attorney, Agent, or Firm—Carole Truesdale; Karl G. Hanson

(57) ABSTRACT

A compound comprising

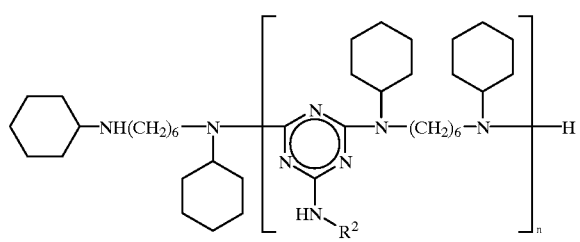

wherein $R^2$ is an alkyl group which may be straight chain or branched and n is a number of from 2 to 40.

4 Claims, 2 Drawing Sheets

COMPOUNDS USEFUL AS RESIN ADDITIVES

This is a division of application Ser. No. 08/982,687 filed Dec. 2, 1997, which is a division of application Ser. No. 08/514,866 filed Aug. 14, 1995.

FIELD OF THE INVENTION

This invention provides fibrous webs capable of having enhanced electret properties, electret webs having such properties, compositions for preparing same, methods of preparing such webs and compositions and compounds useful in such webs and methods. The webs and compositions include blends of electret-forming polymers and electret property enhancing additives, the webs being charged by a process which includes impingement of jets of water or a stream of water droplets onto the web. The electret webs are particularly useful in filtration materials, for example for respirators or room or vehicle air filtration, and in other electrostatic aerosol filtration applications.

BACKGROUND OF THE INVENTION

For many years nonwoven fibrous webs have been used for filtration and other purposes. Some of such webs have been made from polypropylene using melt-blowing techniques of the type described in Report No. 4364 of the Naval Research Laboratories, published May 25, 1954, entitled "Manufacture of Super Fine Organic Fibers" by Van A. Wente et al. Such melt-blown microfiber webs continue to be in widespread use for filtering particulate contaminants, for example, as face masks and as water filters, and for other purposes, such as sorbent webs for removal of oil from water, as acoustic insulation and as thermal insulation.

The aerosol filtration efficiency of nonwoven fibrous webs can be improved by imparting an electrical charge to the fibers, forming an electret material. A number of methods are known for forming such electret materials. Such methods include, for example, bombarding melt-blown fibers as they issue from the die orifices, as the fibers are formed, with electrically charged particles such as electrons or ions, charging fibers by means of corona discharge after fiber formation or imparting a charge to a fiber mat by means of carding and/or needle tacking (tribocharging). Recently, a method in which jets of water or a stream of water droplets impinge on a nonwoven web at a pressure sufficient to provide filtration enhancing electret charge has been described.

Other types of nonwoven fibrous webs useful for filtration purposes have been prepared by fibrillating films of polyolefin to form a fibrous material. Such fibrillated materials may be charged as the film, for example, by corona discharge and then fibrillated, collected and processed into a filter.

Resins used in preparing the filtration material are generally required to be substantially free of materials which could increase the electrical conductivity or otherwise interfere with the ability of the fibers to accept and hold electrostatic charge. For example, certain polystyrene-type polymers have better properties if they have not more than 1% by weight of electron-donor impurities and not more than 0.5% by weight of electron-acceptor impurities.

Additives, however, are known which provide improved electret properties when blended with the resin. Electret materials prepared by compounding 4-methyl-1-pentene polymer with at least one compound selected from compounds which have a phenol group, compounds of higher aliphatic carboxylic acids and metal salts thereof, compounds of ester thiocarboxylates, phosphorus acid group containing compounds, and ester group containing compounds and providing a charge by exposure to high voltage have been disclosed. Also disclosed is an electret metal salt in an amount of not less than 100 ppm in terms of the metal with charging carried out by a conventional procedure such as rubbing or corona charge treatment.

Also known are polypropylene, including blends and copolymers, electret materials containing at least one stabilizer selected from hindered amines, nitrogen-containing hindered phenols, and metal-containing hindered phenols. The electret may further contain an additional stabilizer selected from phenol-, sulfur-, and phosphorous-containing stabilizers and/or an ultraviolet light absorber with charging being carried out in a high voltage field at room temperature. Electret filters prepared from a resin whose angle of contact upon wetting with pure water is no less than 95° or has been adjusted to no less than 95° by addition of silicone oil have been disclosed. The electret resin may optionally contain other additives, including heat stabilizers, weathering agents, anti-blocking agents, and inorganic or organic fillers. Charging may be carried out in various ways. Further disclosed are electret filter media with a melt processable fluorochemical additive having a melting point of at least 25° C. and a molecular weight of about 500 to 2500. Charging involves subjecting the material to corona discharge or pulsed high voltage.

SUMMARY OF THE INVENTION

The present invention provides a method of making a fibrous electret material comprising the steps of (1) forming a fibrous web of nonconductive thermoplastic fibers from a blend of nonconductive thermoplastic resin and an additive which is (a) a thermally stable organic compound or oligomer containing at least one perfluorinated moiety, said compound or oligomer preferably having a fluorine content of at least about 18 percent by weight or (b) a thermally stable organic triazine compound or oligomer containing at least one nitrogen atom in addition to those in the triazine group of (c) a combination thereof; (2) impinging jets of water or a stream of water droplets onto the web at a pressure sufficient to provide the web with filtration enhancing electret charge; and (3) drying the web.

The present invention further provides a composition comprising a blend of a thermoplastic resin and at least one compound or oligomer which is

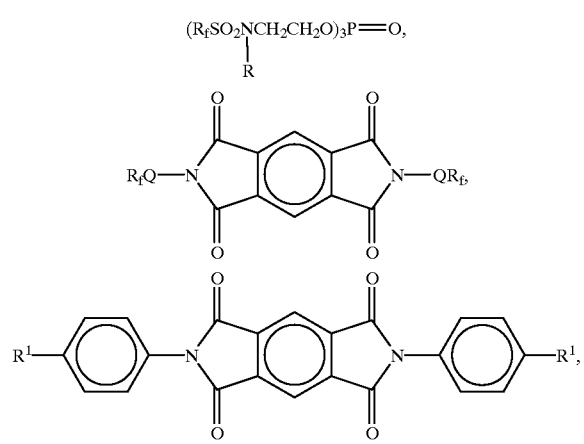

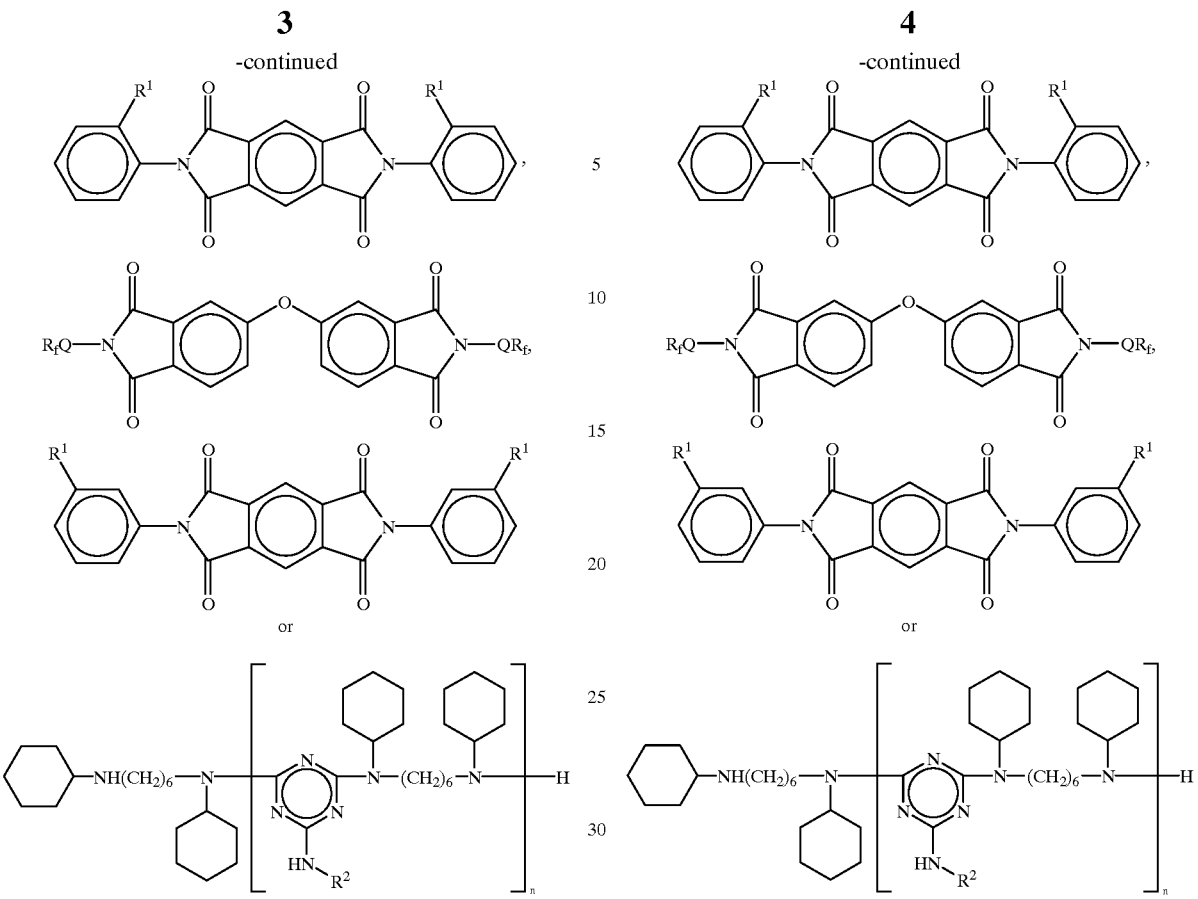

wherein $R_f$ is a perfluorinated moiety preferably having about 3 to 20 carbon atoms, more preferably about 6 to 12 carbon atoms and which may contain one or more catenary ether oxygen atoms, Q is a linking group selected from alkylene groups having 1 or 2 carbon atoms, sulfonamido groups or combinations thereof, R is an alkyl group preferably having 1 to 4 carbon atoms, $R^1$ is a perfluoroalkyl group preferably having 1 to 4 carbon atoms, $R^2$ is an alkyl group which may be straight chain or branched and preferably having 4 to 10 carbon atoms and n is a number of from 2 to 40, preferably 2 to 20, more preferably 4 to 10.

The present invention, in another aspect, provides fibrous webs comprising a blend of thermoplastic resin and at least one compound or oligomer which is wherein $R_f$ is a perfluorinated moiety preferably having about 3 to 20 carbon atoms, more preferably about 6 to 12 carbon atoms and which may contain one or more catenary ether oxygen atoms, Q is a linking group selected from alkylene groups having 1 or 2 carbon atoms, sulfonamido groups or combinations thereof, R is an alkyl group preferably having 1 to 4 carbon atoms, $R^1$ is a perfluoroalkyl group preferably having 1 to 4 carbon atoms, $R^2$ is an alkyl group which may be straight chain or branched and preferably having 4 to 10 carbon atoms and n is a number of from 2 to 40, preferably 2 to 20, more preferably 4 to 10.

The present invention still further provides electret filter media comprising a fibrous web of a blend of a thermoplastic resin and at least one compound or oligomer which is

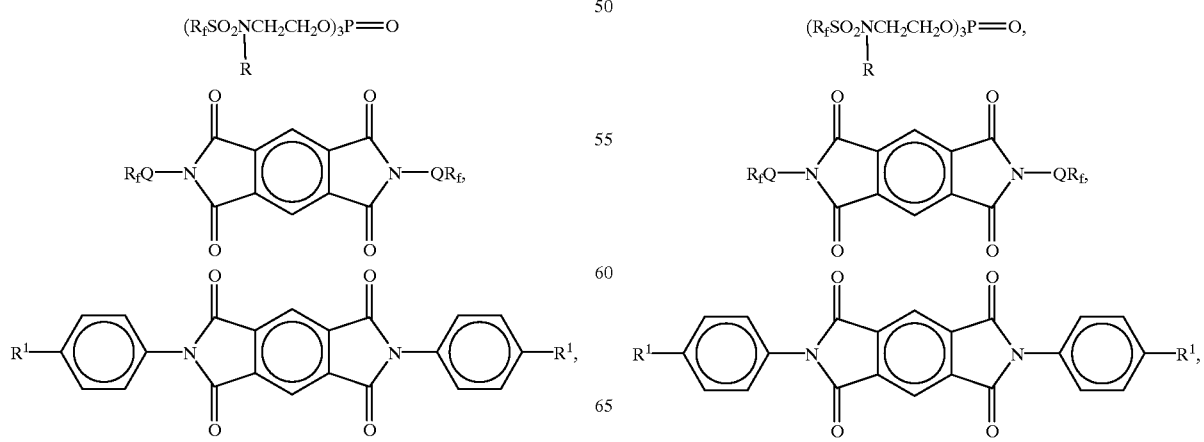

-continued

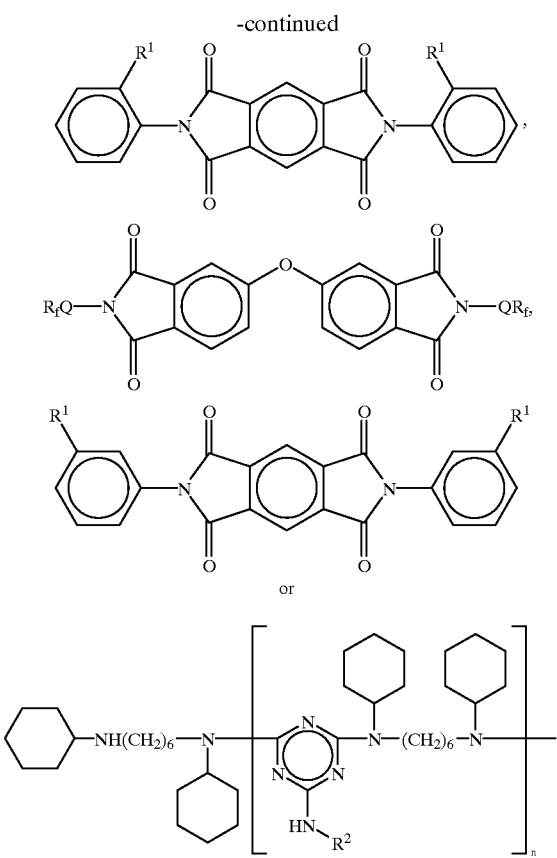

wherein $R_f$ is a perfluorinated moiety preferably having about 3 to 20 carbon atoms, more preferably about 6 to 12 carbon atoms and which may contain one or more catenary ether oxygen atoms, Q is a linking group selected from alkylene groups having 1 or 2 carbon atoms, sulfonamido groups or combinations thereof, R is an alkyl group preferably having 1 to 4 carbon atoms, $R^1$ is a perfluoroalkyl group preferably having 1 to 4 carbon atoms, $R^2$ is an alkyl group which may be straight chain or branched and preferably having 4 to 10 carbon atoms and n is a number of from 2 to 40, preferably 2 to 20, more preferably 4 to 10, said web having sufficient charge to exhibit improved filtration efficiency over a web having no compound or oligomer.

The fibrous electret material prepared according to the method of the present invention exhibits greater charge when charged by impingement of jets of water or streams of water droplets than do comparable webs not containing the additive. This provides improved filtration properties. Such materials are useful, for example, as respirator filters, vehicle ventilation filters, air condition filters, and other air filters. In the case of respirators the presence of the additive provides decreased breathing resistance and reduced weight and bulk without decreasing the filtration efficiency, or improved filtration efficiency without increasing the breathing resistance, weight, and bulk. Such respirators are described, for example, in U.S. Pat. No. 4,536,440 and U.S. application Ser. No. 08/079,234 which are incorporated herein by reference.

DETAILED DESCRIPTION OF THE INVENTION

Figure 1:
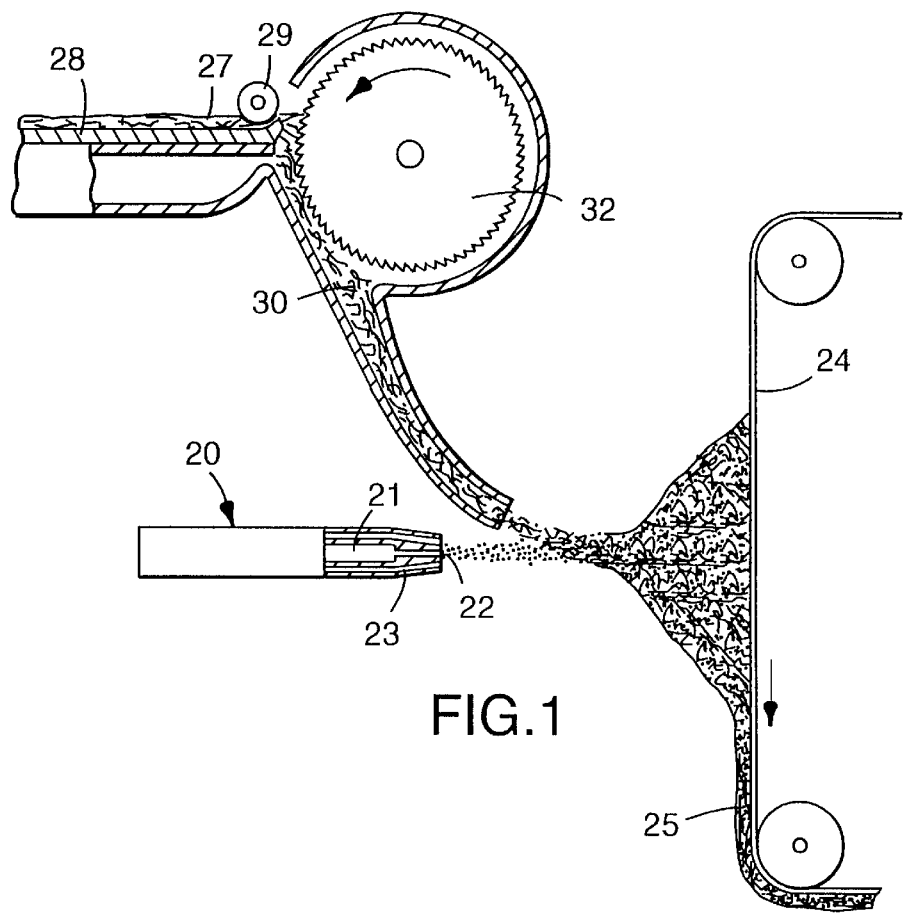
FIG. 1 is a side view of an apparatus useful in making the nonwoven microfiber web used in the method of the present invention.

Thermoplastic resins useful in the present invention include any thermoplastic nonconductive polymer capable of having a high quality of trapped charge when formed into a fibrous web treated by impingement of jets of water or a stream of water droplets. Polymers capable of acquiring a trapped charge include polyolefins such as polypropylene, polyethylene, and poly-4-methyl-1-pentene; polyvinyl chloride; polystyrene; polycarbonates; and polyesters. Preferred materials include polypropylene, poly-4-methyl-1-pentene, blends thereof or copolymers formed from at least one of propylene and 4-methyl-1-pentene.

One class of suitable additive materials is organic materials that contain at least one perfluorinated moiety and have a fluorine content of at least 18% by weight. These materials must be thermally stable at the extrusion temperature of the polymeric resin in order to withstand processing without undesirable degradation or volatilization. Usually molecular weights of 500 or greater are sufficient to avoid excessive volatilization. Such compounds include, for example, short-chain tetrafluoroethylene telomers, fluoroaliphatic alkanes having the formula $C_xF_{2x+2}$ wherein x is from about 20 to 30.

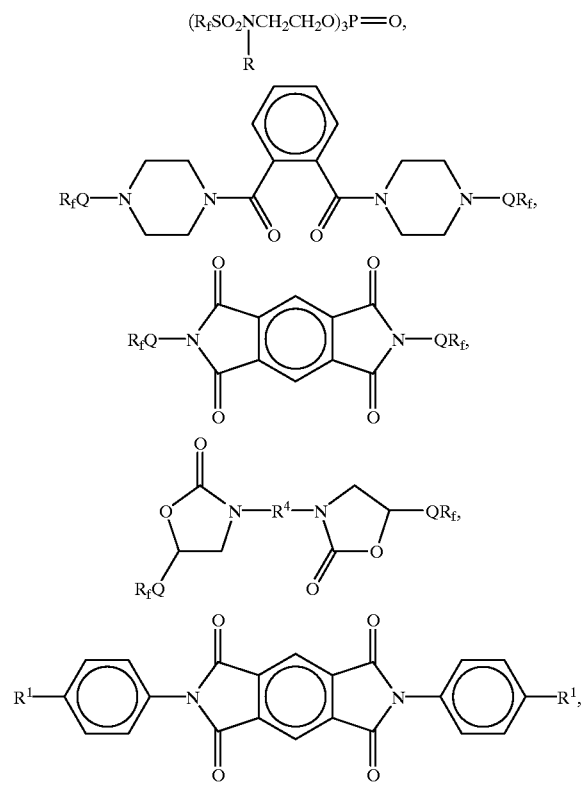

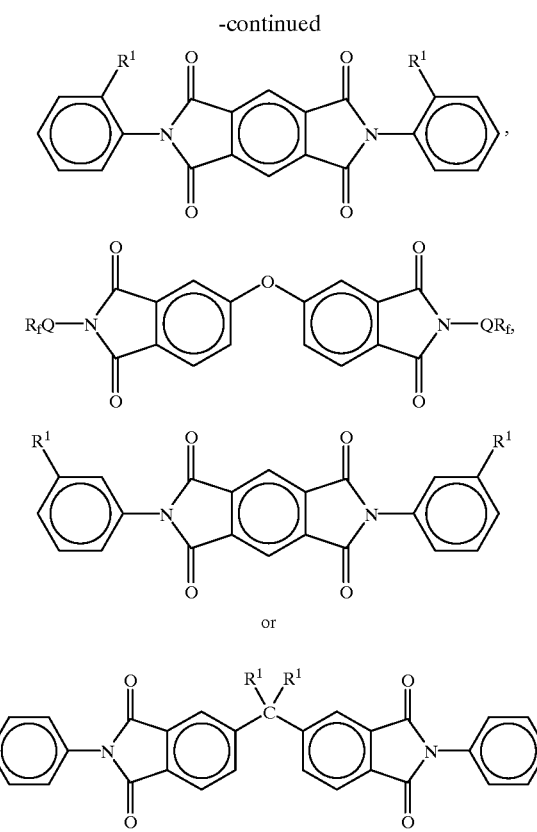

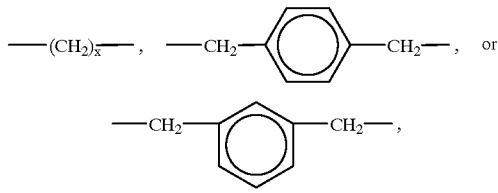

wherein $R_f$ is a perfluorinated moiety preferably having about 3 to 20 carbon atoms, more preferably about 6 to 12 carbon atoms and which may contain one or more catenary ether oxygen atoms, Q is a linking group selected from alkylene groups having 1 or 2 carbon atoms, sulfonamido groups or combinations thereof, and R is an alkyl group preferably having 1 to 4 carbon atoms, $R^1$ is a perfluoroalkyl group preferably having 1 to 4 carbon atoms, $R^4$ is wherein x is 2 to 12.

Another class of suitable additive materials is organic triazine compounds or oligomers with at least one additional nitrogen-containing groups. Again, they must be thermally stable at the extrusion temperature of the polymeric resin such that undesirable degradation on volatilization do not occur. Those compounds or oligomers having a molecular weight of usually at least 500 generally are not lost by volatilization. Such compounds or oligomers include

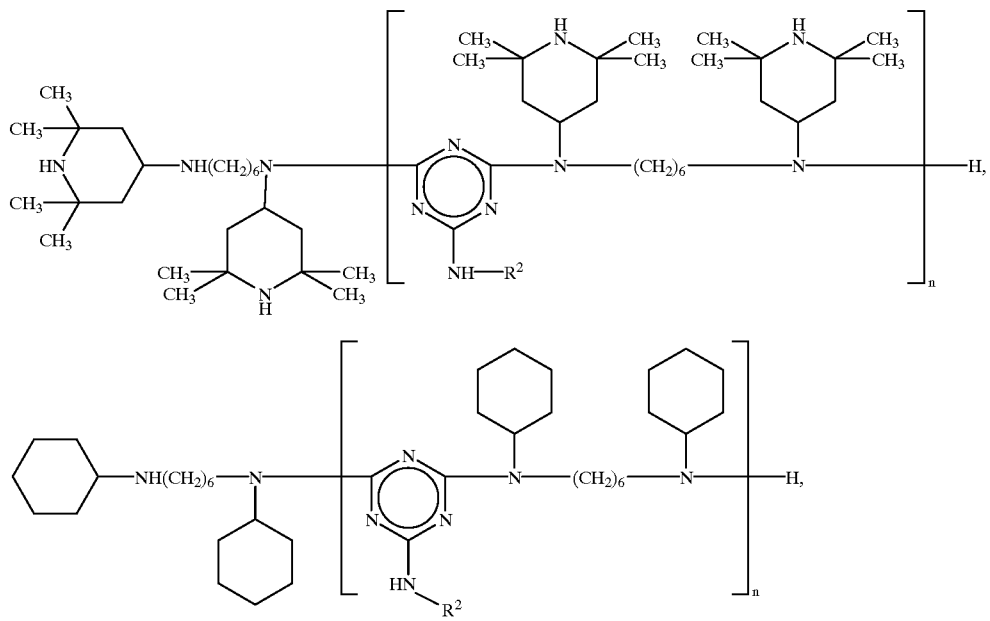

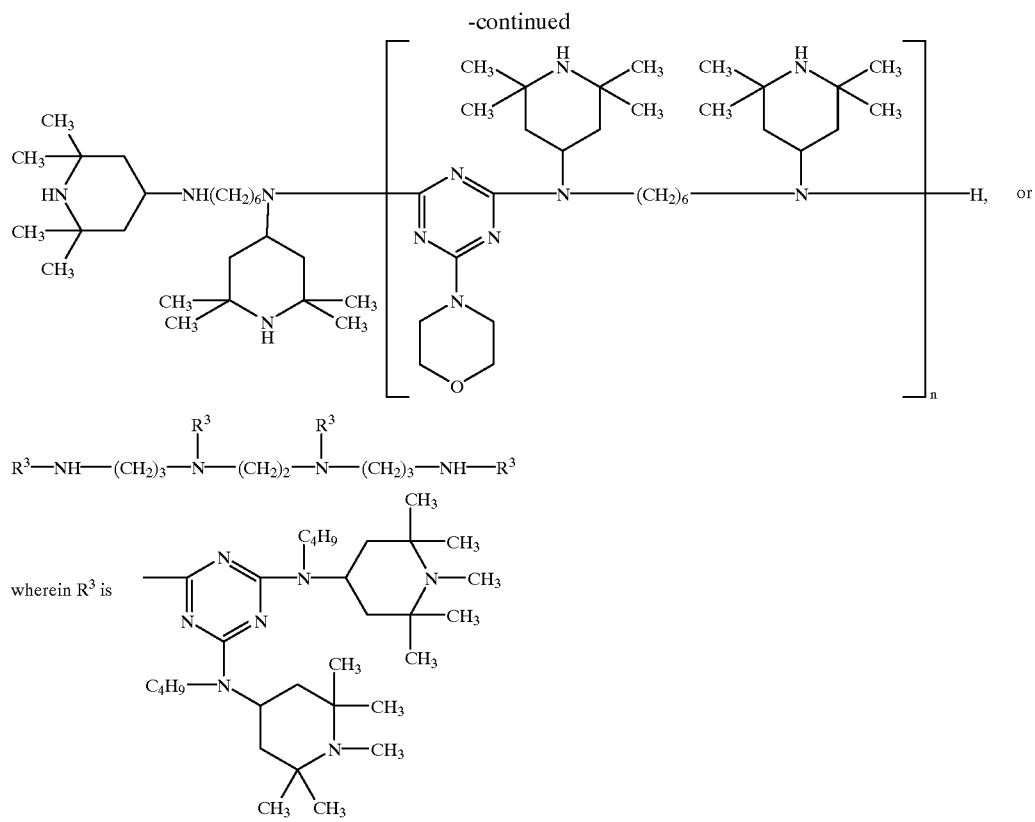

wherein $R^2$ is an alkyl group which may be straight chain or branched and preferably having 4 to 10 carbon atoms and n is a number of from 2 to 40, preferably 2 to 20, more preferably 4 to 10.

The fluorochemical additive or the triazine-based additive is preferably present in amounts of about 0.1 to 10 weight percent, more preferably about 0.2 to 5 weight percent, most preferably about 0.5 to 2 weight percent.

The blend of the thermoplastic resin and the additive can be prepared by well-known methods. The resin and additive can be preheated and pelletized, then the pellets can be melt extruded. Alternatively, the additive can be blended with the resin in the extruder and then melt extruded. Useful extrusion conditions are generally those which are suitable for extruding the resin without the additive. The blended mixture may be processed into a fibrous filter web by any known technique.

Melt blown microfibers useful in the present invention can be prepared as described in Van A. Wente, "Superfine Thermoplastic Fibers," *Industrial Engineering Chemistry*, vol. 48, pp. 1342–1346 and in Report No. 4364 of the Naval Research Laboratories, published May 25, 1954, entitled "Manufacture of Super Fine Organic Fibers" by Van A. Wente et al.

The resin used to form the fibers useful in the present invention preferably is a thermoplastic nonconductive, i.e., having a resistivity greater than $10^{14}$ ohm.cm, resin capable of having a high quantity of trapped charge. That the resin is capable of having a high quantity of trapped charge can be determined by measuring the filtration performance of the web prior to the impingement of jets of water or a stream of water droplets, treating the web by such impingement and drying and again determining filtration performance. An increase in performance is indicative of trapping charge.

This can be configured by subjecting the treated web to a charge destroying means such as exposure to X-ray radiation, alcohol such as isopropanol, or heat at a temperature about 30° C. below the melting point to near the melting point, and again measuring the performance which is then similar to an untreated, i.e., not subjected to water impingement, web.

Preferred resins include polypropylene, poly(4-methyl-1-pentene), blends thereof or copolymers formed from at least one of propylene and 4-methyl-1-pentene. The resin should be substantially free from materials such as antistatic agents which could increase the electrical conductivity or otherwise interfere with the ability of the fibers to accept electrostatic charges. The fibers can be of a single resin, formed of a resin blend, e.g., polypropylene and poly(4-methyl-1-pentene), or formed of two resins in layered or core/sheath configurations.

Blown microfibers for fibrous electret filters of the invention typically have an effective fiber diameter of from about 3 to 30 micrometers preferably from about 7 to 15 micrometers, as calculated according to the method set forth in Davies, C. N., "The Separation of Airborne Dust and Particles," Institution of Mechanical Engineers, London, Proceedings 1B, 1952.

Staple fibers may also be present in the web. The presence of staple fibers generally provides a more lofty, less dense web than a web of only blown microfibers. Preferably, no more than about 90 weight percent staple fibers are present, more preferably no more than about 70 weight percent. Such webs containing staple fiber are disclosed in U.S. Pat. No. 4,118,531 (Hauser) which is incorporated herein by reference.

The electret filter media prepared according to the method of the present invention preferably has a basis weight in the range of about 10 to 500 g/m², more preferably about 10 to 100 g/m². In making melt-blown microfiber webs, the basis weight can be controlled, for example, by changing either the collector speed or the die throughput. The thickness of the filter media is preferably about 0.25 to 20 mm, more preferably about 0.5 to 2 mm. The electret filter media and the resin from which it is produced should not be subjected to any unnecessary treatment which might increase its electrical conductivity, e.g., exposure to gamma rays, ultraviolet irradiation, pyrolysis, oxidation, etc.

Nonwoven microfiber webs useful in the present invention may be prepared using an apparatus as shown in FIG. 1. Such as apparatus includes a die 20 which has an extrusion chamber 21 through which liquified fiber-forming material is advanced; die orifices 22 arranged in line across the forward end of the die and through which the fiber-forming material is extruded; and cooperating gas orifices 23 through which a gas, typically heated air, is forced at high velocity. The high velocity gaseous stream draws out and attenuates the extruded fiber-forming material, whereupon the fiber-forming material solidifies as microfibers during travel to a collector 24 to form web 25.

When staple fibers are present in the web, they may be introduced through use of a lickerin roll 32 disposed above the microfiber blowing apparatus as shown in FIG. 1. A web 27 of staple fibers, typically a loose, nonwoven web such as prepared on a garnet of RANDO-WEBBER apparatus, is propelled along table 28 under drive roll 29 where the leading edge engages against the lickerin roll 32. The lickerin roll 32 picks off fibers from the leading edge of web 27 separating the fibers from one another. The picked fibers are conveyed in an air stream through an inclined trough or duct 30 and into the stream of blown microfibers where they become mixed with the blown microfibers. When particulate matter is to be introduced into the web it may be added using a loading mechanism similar to duct 30.

Hydrocharging of the web is carried out by impinging jets of water or a stream of water droplets onto the web at a pressure sufficient to provide the web with filtration enhancing electret charge. The pressure necessary to achieve optimum results will vary depending on the type of sprayer used, the type of polymer from which the web is formed, the type and concentration of additives to the polymer, the thickness and density of the web and whether pretreatment such as corona surface treatment was carried out prior to hydrocharging. Generally, pressures in the range of about 10 to 500 psi (69 to 3450 kPa) are suitable. Preferably the water used to provide the water droplets is relatively pure. Distilled or deionized water is preferable to tap water.

The jets of water or stream of water droplets can be provided by any suitable spray means. Apparatus useful for hydraulically entangling fibers are generally useful in the method of the present invention, although operation is carried out at lower pressures in hydrocharging than generally used in hydroentangling.

Figure 2:
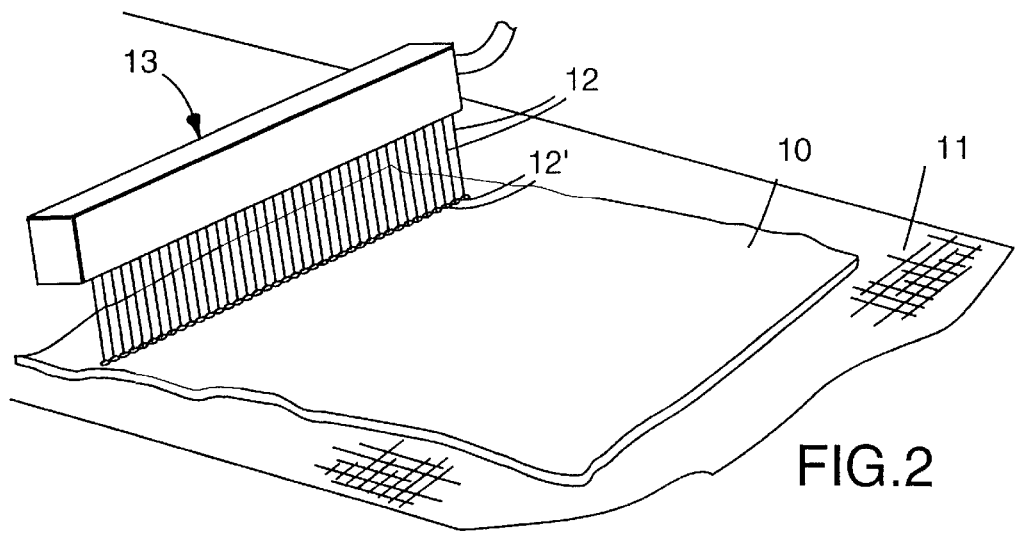
FIG. 2 is a perspective view of a water jet spray apparatus useful in the present invention.

An example of a suitable spray means is shown in FIG. 2 where fibrous web 10 is transported on support means 11. The transport means may be in the form of a belt, preferably porous, such as a mesh screen or fabric. Orifices 12 in water jet head 13 provide the water spray, with a pump (not shown) providing the water pressure. Water jets 12 impinging on web 10 at impingement points 12'. Preferably, a vacuum is provided beneath a porous support to aid in passage of the spray through the web and to reduce drying energy requirements.

Figure 3:
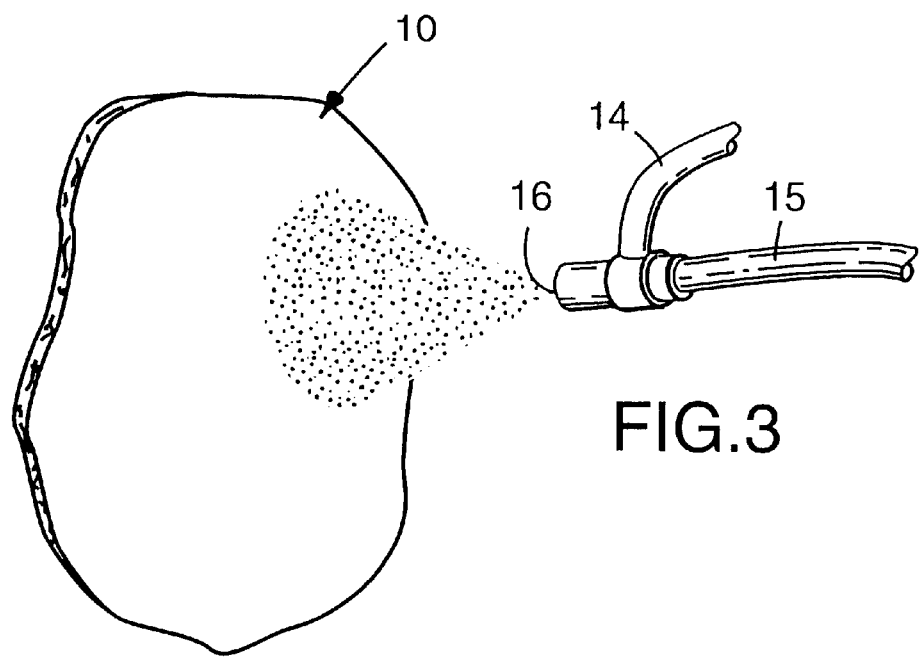
FIG. 3 is a perspective view of a nebulizer useful in the present invention.
Figure 4:
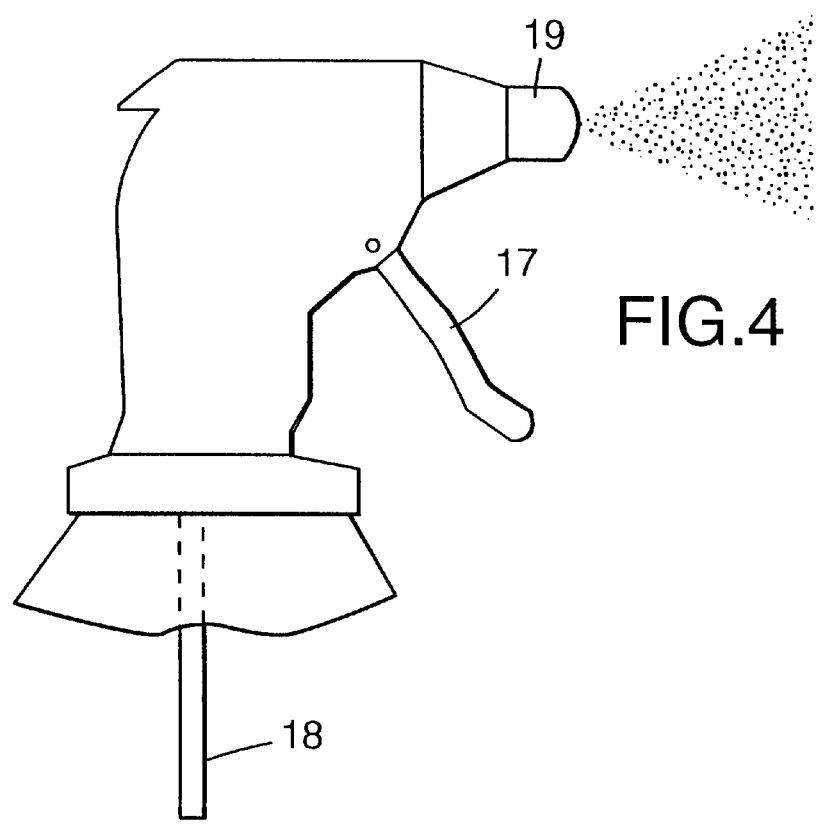
FIG. 4 is a perspective view of a pump action sprayer useful in the present invention.

Further examples of spray means suitable for use in the method of the present invention include nebulizers such as that shown in FIG. 3 wherein water provided through water line 14 and pressurized air provided through air line 15 are supplied to a nozzle 16 to provide a spray mist to impact web 10 and pump action sprayers such as that shown in FIG. 4 where a pump handle 17 forces water provided by water supply means 18 through nozzle 19 to provide a spray mist in addition to other known spray means.

The enhanced performance of the filter media observed with the use of the fluorinated additives can often be yet further enhanced by annealing, i.e., heating for a sufficient time at a sufficient temperature to cause the fluorinated additive to bloom to the surface of the fibers. Generally, about 1 to 10 minutes at about 140° C. is sufficient for polypropylene filter media although shorter times may be used at higher temperatures and longer times may be required at lower temperatures.

EXAMPLES

The following examples should not be construed as limiting in any way either the spirit or scope of the present invention. In the examples, all percentages and parts are by weight unless otherwise noted.

The following test method was used to evaluate the webs prepared in the examples:

DOP Penetration and Pressure Drop Test Method

Dioctyl phthalate (DOP) 0.3 micrometer diameter particles at a concentration of between 70 and 110 mg/m³ are generated using a TSI No. 212 sprayer with four orifices and 30 psi (207 kPa) clean air. The particles are forced through a sample of filter media which is 11.45 cm in diameter at a rate of 42.5 L/min, which is a face velocity of 6.9 centimeters per second. The sample is exposed to the aerosol for 30 seconds. The penetration is measured with an optical scattering chamber, Percent Penetration Meter Model TPA-8F available from Air Techniques Inc. The pressure drop is measured at a flow rate of 42.5 L/min and a face velocity of 6.9 cm/sec using an electronic manometer.

The penetration and pressure drop are used to calculate a quality factor "QF" from the natural log (ln) of the DOP penetration by the following formula:

$$QF[1/\text{mm H}_2\text{O}] = \frac{-\ln\left[\frac{DOP\ \text{Penetration}(\%)}{100}\right]}{\text{Pressure Drop [mm H}_2\text{O]}}$$

A higher QF value indicates better filtration performance. Decreased QF values effectively correlate with decreased filtration performance.

Example 1 and Comparative Example C1

N-(perfluorooctylsulfonyl)-piperazine (34.1 g, 60 mmol), triethylamine (6.7 g, 66 mmol) and chloroform (200 mL) were added to a 3-neck round bottom 500 mL flask equipped with a nitrogen inlet and a magnetic stirrer and the mixture was stirred. Phthaloyl dichloride (95%, 6.4 g, 30 mmol) was added dropwise as a chloroform solution. After the addition was complete, the reaction mixture was stirred under nitrogen atmosphere for 30 minutes. The reaction product was washed with deionized water several times, allowed to air dry and then was oven dried at 105° C. for three hours. The solid product was ground to form a powder and one part was added to four parts refluxing solvent (95% ethanol/5% water) and refluxed for about ten minutes. The solvent was removed by filtration. The resulting additive was dried at 71°

C. The solid product had a melting point of 191° C. The structure of the additive,

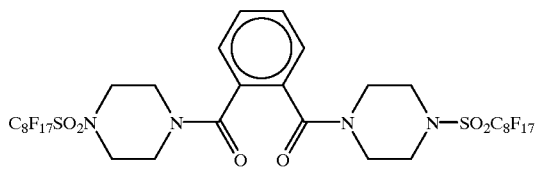

was confirmed by NMR.

This additive was dry blended with polypropylene (ESCORENE PP-3503G, available from Exxon Corporation) and the blend was extruded as described in Van A. Wente, "Superfine Thermoplastic Fibers," Industrial Engineering Chemistry, vol. 48, pp. 1342–1346. The fluorochemical additive was blended at a level of 1%. The extrusion temperature was about 280 to 300° C. and the extruder was a BRABENDER™ conical twin screw extruder (available from Brabender Instruments, Inc.) operating at a rate of about 3.2 to 4.5 kg/hr (7–10 lb/hr). A melt blown microfiber web was formed having a basis weight of 52 g/m², an effective fiber diameter of 5.8 μm and a thickness of 1.4 mm.

For Comparative Example C1, a sample was prepared from the same lot of polypropylene at the same time but contained no additive (beyond any present from the manufacturer). The web had a basis weight of 52 g/m², an effective fiber diameter of 7.7 μm and a thickness of 0.9 mm.

Samples of the webs were subjected to impingement of water jets provided by a hydroentangler (Laboratory Model, serial no. 101, available from Honeycomb Systems Corp.), similar to that shown in FIG. 1, which had a spray bar width of 24 in (0.6 m) with 40 spray orifices, each 0.005 in (0.13 mm) in diameter, per inch (2.5 cm) width at a water pressure of 690 kPa. Each sample passed beneath the spray bar at a rate of 3.5 m/min, and was treated once on each face, vacuum extracted and dried at 70° C. for one hour. The treated samples were tested for DOP penetration and pressure drop and the quality factor was calculated. The pressure drop and quality factor (QF) are reported in Table 1.

TABLE 1

| | Pressure Drop (mm H₂O) | Quality Factor |
|---|---|---|
| Example 1 | 4.13 | 1.14 |
| Comparative Example C1 | 2.73 | 1.01 |

Example 2

Fluorotelomer (provided as VYDAX™, 20% dispersion of the telomer in trichlorotrifluoroethylene, available from E. I. DuPont De Nemours & Co., Inc. was isolated to yield a waxy short-chain telomer of tetrafluoroethylene with a molecular weight of about 3700 and a melting point of about 300° C.

Microfiber webs were prepared and tested as in Example 1 except the fluorotelomer additive was used. The basis weight was 54 g/m², the effective fiber diameter was 6.2 μm, the thickness was 1.4 mm, the pressure drop was 4.06 and the quality factor was 1.18.

Example 3 and Comparative Example C3

Microfiber webs were prepared and tested as in Example 1 and Comparative Example C1 except the polypropylene used was ESCORENE PP-3495G, available from Exxon Corp., the extrusion temperature was 240 to 260° C. and

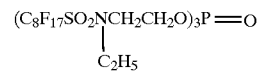

which can be prepared as described in Example 4 of U.S. Pat. No. 3,094,547 (Heine), which is incorporated herein by reference, was used as the additive in Example 3. The results are set forth in Table 2.

TABLE 2

| | Basis Weight (g/m²) | Effective Fiber Diameter (μm) | Thickness (mm) | Pressure Drop (mm H₂O) | Quality Factor |
|---|---|---|---|---|---|
| Example 3 | 59 | 9.9 | 1.0 | 1.39 | 1.15 |
| Comparative Example C3 | 57 | 10.6 | 1.0 | 1.27 | 0.37 |

Examples 4 and 5 and Comparative Examples C4 and C5

To a stirred solution of perfluorooctylmethylamine (44.9 g, 0.100 mol) in 150 g N,N-dimethylformamide at 70° C. was added 1,2,4,5-benzenetetracarboxylic dianhydride (10.9 g, 0.050 mol) over a period of three minutes. An exotherm to 107° C. was observed and the reaction mixture became turbid. The temperature was increased and the turbidity disappeared and after about 30 minutes a solid began forming. This slurry was heated at about 100° C. for 22 hours, cooled to 55° C. and acetic anhydride (35 g) and pyridine (25 g) were added. After three hours additional heating the slurry was cooled to room temperature, filtered, washed with N,N-dimethylformamide, then methanol, and the isolated solid was dried at 105° C. to yield 44.7 g of white solid product. The additive had the structure

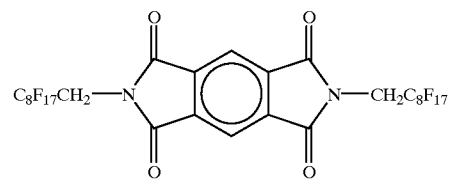

For Examples 4 and 5 Comparative Examples C4 and C5, microfiber webs were prepared as in Example 1 and Comparative Example C1 except the polypropylene used was ESCORENE PP-3495G, available from Exxon Corp., the extrusion temperature was 240 to 260° C. and the above-described additive was used. For Example 5 and Comparative Example C5, samples of the webs of Example 4 and Comparative Example C4 were annealed at 140° C. for 10 minutes. The webs were tested for pressure drop and penetration and the quality factors were calculated. The pressure drop and quality factors are set forth in Table 3.

TABLE 3

| | Basis Weight (g/m²) | Effective Fiber Diameter (μm) | Thickness (mm) | Pressure Drop (mm H₂O) | Quality Factor |
|---|---|---|---|---|---|
| Example 4 | 49 | 8.1 | 1.1 | 1.68 | 0.63 |
| Comparative Example C4 | 52 | 8.1 | 1.1 | 1.91 | 0.38 |
| Example 5 | 49 | 8.1 | 1.1 | 1.83 | 0.82 |
| Comparative Example C5 | 52 | 8.1 | 1.1 | 2.02 | 0.51 |

Examples 6–9 and Comparative Examples C6–C9

A compound having the formula

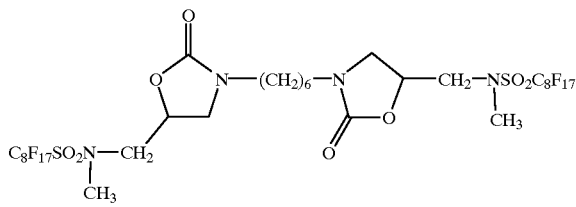

was prepared following the procedure of Example 5 of U.S. Pat. No. 5,099,026 (Howells) which is incorporated herein by reference. The solid product was ground to form a powder and one part was added to four parts refluxing solvent (95% ethanol/5% water) and refluxed for about ten minutes. The resulting slurry was cooled and the solid filtered and dried at 71° C. The resulting solid additive had a melting point of 197° C. as determined by differential scanning calorimetry.

Two lots of webs were prepared as in Example 1 and Comparative Example C1 except the above-described additive was used. Examples 6 and 7 and Comparative Examples C6 and C7 were prepared from Lot 1. Examples 8 and 9 and Comparative Examples C8 and C9 were prepared from Lot 2. The basis weight, effective fiber diameter and thickness was determined and are set forth in Table 4. In Examples 7 and 9 and Comparative Examples C7 and C9, the webs of Examples 6 and 8 and Comparative Examples C6 and C8 were annealed as in Example 5. Samples of each web were tested for penetration and pressure drop and the quality factors were determined. The pressure drop and quality factor for each web are set forth in Table 4.

TABLE 4

| | Basis Weight (g/m²) | Effective Fiber Diameter (μm) | Thickness (mm) | Pressure Drop (mm H₂O) | Quality Factor |
|---|---|---|---|---|---|
| Example 6 | 54 | 8.9 | 1.1 | 1.86 | 0.66 |
| Comparative Example C6 | 54 | 8.6 | 1.1 | 2.20 | 0.77 |
| Example 7 | 54 | 8.9 | 1.1 | 1.90 | 1.39 |
| Comparative Example C7 | 54 | 8.6 | 1.1 | 2.34 | 0.97 |
| Example 8 | 54 | 8.4 | 0.9 | 2.05 | 0.51 |
| Comparative Example C8 | 54 | 8.7 | 1.0 | 1.92 | 0.34 |
| Example 9 | 54 | 8.4 | 0.9 | 2.21 | 1.10 |
| Comparative Example C9 | 54 | 8.7 | 1.0 | 1.99 | 0.49 |

As can be seen from the data in Table 4, annealing the webs containing the additive significantly improved the filtration performance.

Examples 10 and 11 and Comparative Examples C10 and C11

In Example 10, a web was prepared as in Example 1 using a perfluorinated alkane, $C_{24}F_{50}$, available from Aldrich Chemical Co. as the additive. In Comparative Example C10, a similar web was prepared without additive. In Example 11 and Comparative Example C11, the webs of Example 10 and Comparative Example C10 were annealed as in Example 5. The basis weight, effective fiber diameter and thickness were determined for each web and are set forth in Table 5. The pressure drop and penetration were measured and the quality factor was determined. The pressure drop and quality factor are set forth in Table 5.

TABLE 5

| | Basis Weight (g/m²) | Effective Fiber Diameter (μm) | Thickness (mm) | Pressure Drop (mm H₂O) | Quality Factor |
|---|---|---|---|---|---|
| Example 10 | 52 | 7.6 | 0.9 | 2.17 | 0.39 |
| Comparative Example C10 | 54 | 8.7 | 1.0 | 1.92 | 0.34 |
| Example 11 | 52 | 7.6 | 0.9 | 2.23 | 0.60 |
| Comparative Example C11 | 54 | 8.7 | 1.0 | 1.99 | 0.49 |

Example 12 and 13 and Comparative Examples C12 and C13

To a stirred solution of 4-aminobenzotrifluoride (25.0 g, 0.155 mol) in 100 g N,N-dimethylformamide in a 500 mL flask at 55° C. was added 1,2,4,5-benzenetetracarboxylic dianhydride (16.2 g, 0.077 mol) over a period of six minutes. An exotherm to 85° C. was observed and the stirred solution was heated to 120° C. for about four hours, during which time a viscous slurry formed. The slurry was diluted with 10 g of N,N-dimethylformamide and heating was continued for an additional 13 hours. The slurry was then cooled to 63° C. and 50 g acetic anhydride and 34 g pyridine were added. An additional 75 g N,N-dimethylformamide was added to dilute the slurry and aid stirring. Heating was continued for three hours. To aid in separation of the product from the slurry, 165 g tetrahydrofuran and acetone were added to result in 1010 g dilute slurry. After settling had occurred the liquid was decanted and an addition 250 g acetone was added with stirring. Again after settling, the liquid was decanted and the solid dried at 106° C. to give 24.7 g of the desired additive.

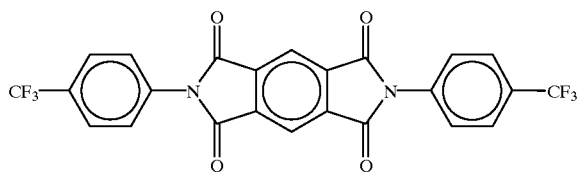

In Example 12, a web was prepared as in Example 1 using this additive. In Comparative Example C12, a similar web was prepared without additive. In Example 13 and Comparative Example C13, the webs of Example 12 and Comparative Example C12 were annealed as in Example 5. The basis weight, effective fiber diameter and thickness were determined for each web and are set forth in Table 6. The pressure drop and penetration were measured and the quality factor was determined. The pressure drop and quality factor are set forth in Table 6.

TABLE 6

| | Basis Weight (g/m²) | Effective Fiber Diameter (μm) | Thickness (mm) | Pressure Drop (mm H₂O) | Quality Factor |
|---|---|---|---|---|---|
| Example 12 | 54 | 8.3 | 1.1 | 1.98 | 1.01 |
| Comparative Example C12 | 62 | 8.1 | 1.1 | 2.40 | 0.41 |
| Example 13 | 54 | 8.3 | 1.1 | 2.03 | 1.25 |
| Comparative Example C13 | 62 | 8.1 | 1.1 | 2.55 | 0.55 |

Example 14 and Comparative Example C14

To a stirred solution of 2-aminobenzotrifluoride (48.3 g, 0.30 mol, in 175 g N,N-dimethylformamide in a 1-liter flask at 65° C. was added 1,2,4,5-benzenetetracarboxylic dianhydride (32.7 g, 0.150 mol) over a period of two minutes. An exotherm to 85° C. was observed and the solution was heated to 98° C. and stirred for about 17 hours after which time a solid had formed. The slurry was cooled to 53° C. and 90 g acetic anhydride and 67 g pyridine were added. The slurry was stirred with mild heating for about 3.5 hours. After cooling to room temperature, the slurry was filtered and the filter cake was washed with N,N-dimethylformamide and then methanol. The wet solid was dried at 107° C. for one hour to yield 37.2 grams of an off-white solid additive having the structure

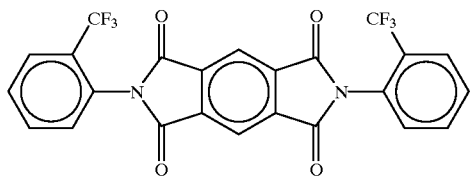

Microfiber webs were prepared and tested as in Example 1 and Comparative Example C1 except the above-described additive was used. The results are set forth in Table 7.

TABLE 7

| | Basis Weight (g/m²) | Effective Fiber Diameter (μm) | Thickness (mm) | Pressure Drop (mm H₂O) | Quality Factor |
|---|---|---|---|---|---|
| Example 14 | 58 | 7.5 | 1.2 | 2.63 | 0.65 |
| Comparative Example C14 | 58 | 7.8 | 1.1 | 2.30 | 0.33 |

Example 15 and Comparative Example C15

To a stirred solution of perfluorononylmethylamine (29.9 g, 0.060 mol, 92% pure) in 90 g N,N-dimethylformamide in a 500 mL flask at 60° C. was added 4,4'-oxydiphthalic anhydride (8.8 g, 0.0284 mol) over a period of three minutes. A mild exotherm to 67° C. was observed and the stirred solution was heated to about 92° C. for about 16 hours, during which time a solid had formed. The slurry was cooled to 48° C. and additional solid formed. To the stirred slurry were added 42 g acetic anhydride and 30 g pyridine and stirring was continued for about 4.5 hours. The slurry was then cooled to room temperature, filtered, and the isolated solid was washed with N,N-dimethylformamide and then methanol, and dried at 106° C. to give 20.8 grams of a white solid additive having the structure

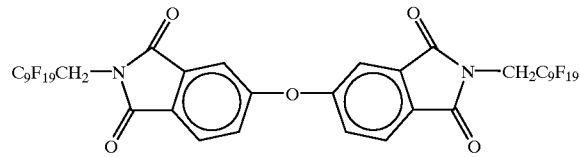

Microfiber webs were prepared and tested as in Example 1 and Comparative Example C1 except the above-described additive was used. The results are set forth in Table 8.

TABLE 8

| | Basis Weight (g/m²) | Effective Fiber Diameter (μm) | Thickness (mm) | Pressure Drop (mm H₂O) | Quality Factor |
|---|---|---|---|---|---|
| Example 15 | 54 | 7.3 | 1.0 | 2.62 | 0.87 |
| Comparative Example C15 | 61 | 8.0 | 1.2 | 2.73 | 0.48 |

Example 16 and Comparative Example C16

To a stirred mixture of C₆F₁₃ O C₄F₈CH₂NH₂ (30.0 g, 0.0531 mol, 73% pure) in 80 g N,N-dimethylformamide in a 250 mL flask at 63° C. was added 4,4'-oxydiphthalic anhydride (6.17 g, 0.020 mol) over a period of five minutes. After heating for about 40 minutes a clear solution had formed. The solution was heated to 117° C. and a small amount of an insoluble oil was removed and heating was continued for about 17.5 hours. The solution was cooled to 55° C., during which time solid had formed. Then, 35 g acetic anhydride and 25 g pyridine were added. An additional 15 g N,N-dimethylformamide were added to dilute the slurry and aid stirring. The resulting mixture was heated for about three hours. The slurry was cooled to room temperature and filtered and the isolated solid was washed with N,N-dimethylformamide, then methanol, and dried at 101° C. to give 18.9 grams of a light-beige solid additive having the structure

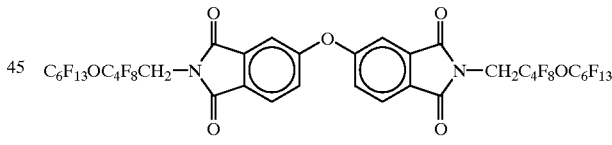

Microfiber webs were prepared and tested as in Example 1 and Comparative Example C1 except the polypropylene used was ESCORENE PP-3495G, available from Exxon Corp., the extrusion temperature was 240 to 260° C. and the above additive was used. The results are set forth in Table 9.

TABLE 9

| | Basis Weight (g/m²) | Effective Fiber Diameter (μm) | Thickness (mm) | Pressure Drop (mm H₂O) | Quality Factor |
|---|---|---|---|---|---|
| Example 16 | 59 | 7.0 | 1.1 | 2.78 | 0.78 |
| Comparative Example C16 | 59 | 7.0 | 1.0 | 2.93 | 0.40 |

Example 17 and Comparative Example C17

To a stirred solution of 3-aminobenzotrifluoride (50.0 g, 0.310 mol) in 200 g N,N-dimethylformamide in a 1-liter flask at 60° C. was added 1,2,4,5-benzenetetracarboxylic dianhydride (33.8 g, 0.155 mol) over a period of three minutes. An exotherm to 86° C. was observed and the stirred solution was heated to 91° C. for 18 hours. Heating was reduced and a solid mass formed. To this mass was added 100 g acetic anhydride, 67 g pyridine and 100 g N,N-dimethylformamide. The solid was broken up and slurry which formed was stirred with mild heating for about three hours. After cooling to room temperature, the slurry was filtered and the filter cake was restirred in 350 g N,N-dimethylformamide, filtered a second time and washed with N,N-dimethylformamide and then methanol. The isolated solid was dried at 104° C. to give 44.0 grams of pale-yellow solid additive which has the structure

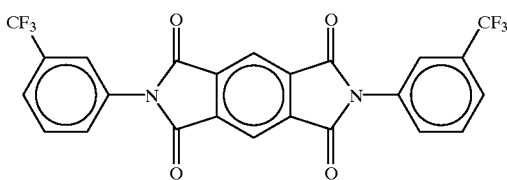

Microfiber webs were prepared and tested as in Example 1 and Comparative Example C1 except the above-described additive was used. The results are set forth in Table 10.

TABLE 10

| | Basis Weight (g/m²) | Effective Fiber Diameter (μm) | Thickness (mm) | Pressure Drop (mm H₂O) | Quality Factor |
|---|---|---|---|---|---|
| Example 17 | 54 | 7.8 | 1.2 | 2.11 | 0.75 |
| Comparative Example C17 | 59 | 8.0 | 1.2 | 2.14 | 0.36 |

Example 18 and Comparative Example C18

To a stirred solution of aniline (16.8 g, 0.180 mol) in 150 g N,N-dimethylformamide in a 500 mL flask at 75° C. was added 4,4'-(hexafluoroisopropylidene) diphthalic anhydride (40.0 g, 0.090 mol) over a period of three minutes. An exotherm to 97° C. was observed and the solution was heated to about 130° C. for about 18 hours. After cooling to 67° C., 66 g of acetic anhydride and 44 g pyridine were added and heating was continued for about 3.5 hours. The solution was concentrated to 64.8 g and the residue was dissolved in 200 g methanol. This solution was chilled to about −20° C. and the solid that formed was isolated by filtration, washed with cold methanol and dried at 106° C. to yield 11.0 grams of a buff-colored solid additive which had the structure

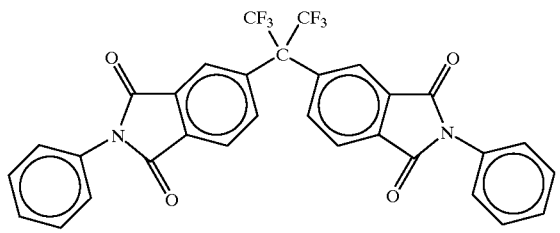

Microfiber webs were prepared and tested as in Example 1 and Comparative Example C1 except the above-described additive was used. The results are set forth in Table 11.

TABLE 11

| | Basis Weight (g/m²) | Effective Fiber Diameter (μm) | Thickness (mm) | Pressure Drop (mm H₂O) | Quality Factor |
|---|---|---|---|---|---|
| Example 18 | 59 | 7.4 | 1.3 | 2.50 | 0.64 |
| Comparative Example C18 | 57 | 7.2 | 1.4 | 2.65 | 0.48 |

Examples 19 and 20 and Comparative Examples C19 and C20

To a stirred solution of perfluorooctylmethylamine (22.4 g, 0.050 mol) in 75 g N,N-dimethylformamide in a 250 mL flask at 55° C. was added 4,4'-oxydiphthalic anhydride (7.75 g 0.025 mol) over a period of five minutes. An exotherm to 75° C. was observed and the solution was heated to 92° C. for about 16 hours. A mass of solid which has formed was broken up and 25 g N,N-dimethylformamide were added to give a stirrable slurry. To this slurry which was maintained at 55° C. were added 35 g acetic anhydride and 25 g pyridine and heating was continued for about 2.5 hours. After cooling to room temperature the slurry was filtered, washed with N,N-dimethylformamide, then methanol, and the isolated wet solid was dried at 104° C. to give 22.6 g additive which had the structure

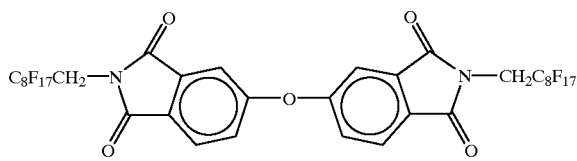

In Example 19, a web was prepared as in Example 1 except this additive was used, the polypropylene used was ESCORENE PP-3495G, available from Exxon Corp., and the extrusion temperature was 240 to 260° C. In Comparative Example C19, a similar web was prepared without additive. In Example 20 and Comparative Example C20, the webs of Example 19 and Comparative Example C19 were annealed as in Example 5. The basis weight, effective fiber diameter and thickness were determined for each web and are set forth in Table 12. The pressure drop and penetration were measured and the quality factor was determined. The pressure drop and quality factor are set forth in Table 12.

TABLE 12

| | Basis Weight (g/m²) | Effective Fiber Diameter (μm) | Thickness (mm) | Pressure Drop (mm H₂O) | Quality Factor |
|---|---|---|---|---|---|
| Example 19 | 49 | 8.0 | 1.1 | 1.87 | 0.92 |
| Comparative Example C19 | 52 | 8.1 | 1.1 | 1.91 | 0.38 |
| Example 20 | 49 | 8.0 | 1.1 | 1.99 | 0.80 |
| Comparative Example C20 | 52 | 8.1 | 1.1 | 2.02 | 0.51 |

Example 21 and Comparative Example C21

Microfiber webs were prepared and tested as in Example 1 and Comparative Example 1, except 0.5 weight percent CHIMASSORB™ 944FL, having a molecular weight greater than 2500 available from Ciba Geigy Corp. and having the structure

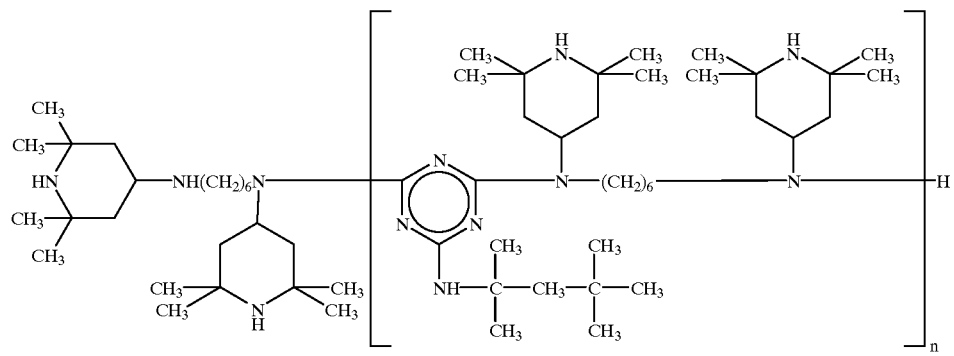

was used as the additive in Example 21. The results are set forth in Table 13.

TABLE 13

| | Basis Weight (g/m²) | Effective Fiber Diameter (μm) | Thickness (mm) | Pressure Drop (mm H₂O) | Quality Factor |
|---|---|---|---|---|---|
| Example 21 | 54 | 8.9 | 1.1 | 1.76 | 1.74 |
| Comparative Example C21 | 57 | 8.3 | 1.1 | 2.02 | 0.60 |

Example 22 and Comparative Example C22

First, N,N'-di-(cyclohexyl)-hexamethylene-diamine was prepared as described in U.S. Pat. No. 3,519,603. Next, 2-(tert-octylamino)-4,6-dichloro-1,3,5-triazine was prepared as described in U.S. Pat. No. 4,297,492. Finally, this diamine was reacted with this dichlorotriazine as described in U.S. Pat. No. 4,492,791 to produce a compound having the structure

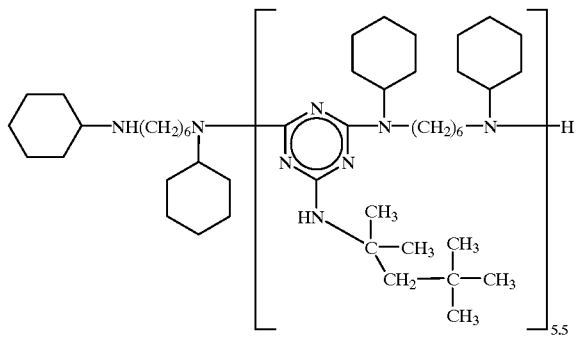

Microfiber webs were prepared and tested as in Example 1 and Comparative Example C1 except 0.5 weight percent additive was used in Example 22. The results are set forth in Table 14.

TABLE 14

| | Basis Weight (g/m²) | Effective Fiber Diameter (μm) | Thickness (mm) | Pressure Drop (mm H₂O) | Quality Factor |
|---|---|---|---|---|---|
| Example 22 | 57 | 8.5 | 1.1 | 2.26 | 1.04 |
| Comparative Example C22 | 54 | 8.6 | 1.1 | 2.20 | 0.77 |

Example 23 and Comparative Example C23

A triazine product was prepared following the procedure of Example 22 except n-octylamine was used in place of tert.-octylamine in the preparation of the dichlorotriazine intermediate. The resulting additive had the structure

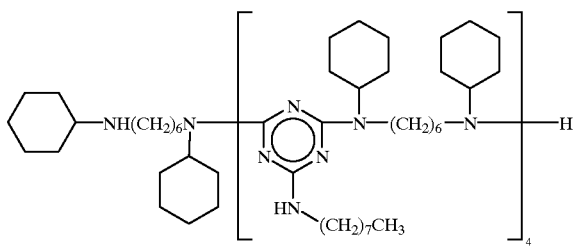

Microfiber webs were prepared and tested as in Example 1 and Comparative Example C1 except 0.5 weight percent additive was used in Example 23. The results are set forth in Table 15.

TABLE 15

| | Basis Weight (g/m²) | Effective Fiber Diameter (μm) | Thickness (mm) | Pressure Drop (mm H₂O) | Quality Factor |
|---|---|---|---|---|---|
| Example 23 | 55 | 10.0 | 0.9 | 1.56 | 1.02 |
| Comparative Example C23 | 54 | 8.6 | 1.1 | 2.20 | 0.77 |

Example 24 and Comparative Example C24

Microfiber webs were prepared and tested as in Example 1 and Comparative Example C1, except 0.5 weight percent CYASORB™ UV3346, available from American Cyanamid Corp. and having the structure

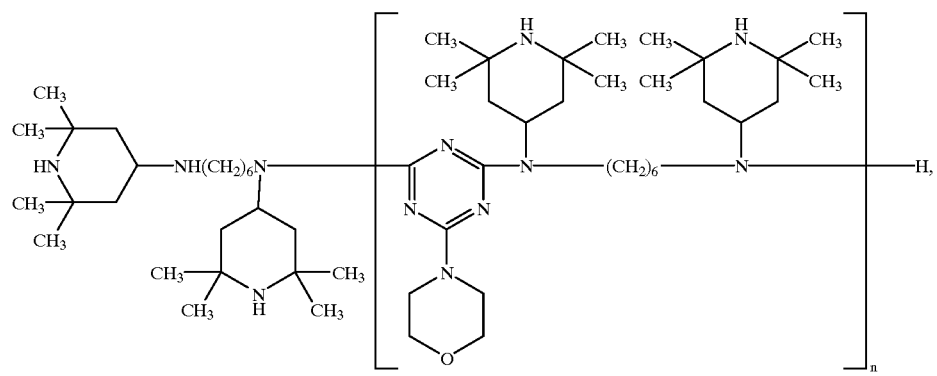

was used as the additive in Example 24. The results are set forth in Table 16.

TABLE 16

|  | Basis Weight (g/m$^2$) | Effective Fiber Diameter (μm) | Thickness (mm) | Pressure Drop (mm H$_2$O) | Quality Factor |
|---|---|---|---|---|---|
| Example 24 | 57 | 7.8 | 1.2 | 2.50 | 1.12 |
| Comparative Example C24 | 56 | 7.0 | 1.3 | 2.53 | 0.46 |

Example 25 and Comparative Example C25

Microfiber webs were prepared and tested as in Example 1 and Comparative Example C1, except 0.5 weight percent CHIMASSORB™ 119, available from Ciba Geigy Corp. and having the structure

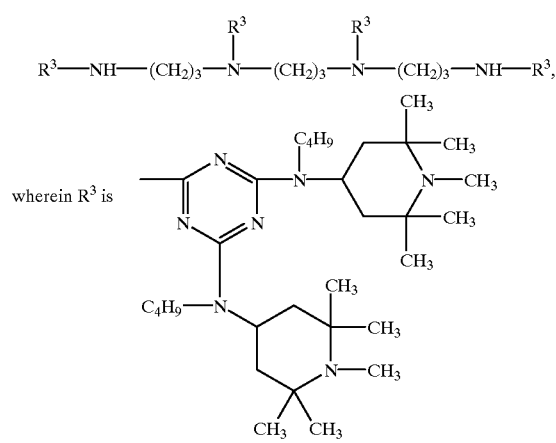

was used as the additive in Example 25. The results are set forth in Table 17.

TABLE 17

|  | Basis Weight (g/m$^2$) | Effective Fiber Diameter (μm) | Thickness (mm) | Pressure Drop (mm H$_2$O) | Quality Factor |
|---|---|---|---|---|---|
| Example 25 | 59 | 8.2 | 1.2 | 2.63 | 1.33 |
| Comparative Example C25 | 60 | 7.5 | 1.3 | 2.66 | 0.41 |

The various modifications and alterations of this invention will be apparent to those skilled in the art without departing from the scope and spirit of this invention and this invention should not be restricted to that set forth herein for illustrative purposes.

What is claimed is:

1. A compound comprising

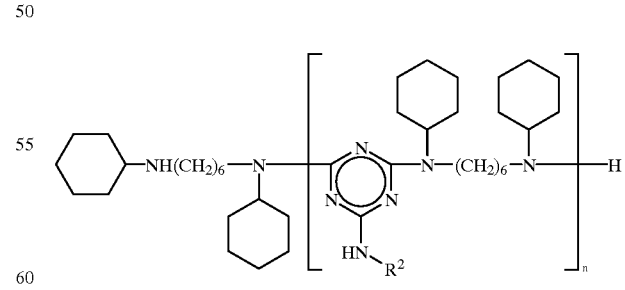

wherein R$^2$ is an alkyl group which may be straight or branched and n is a number of from 2 to 40.

2. The compound of claim 1 comprising
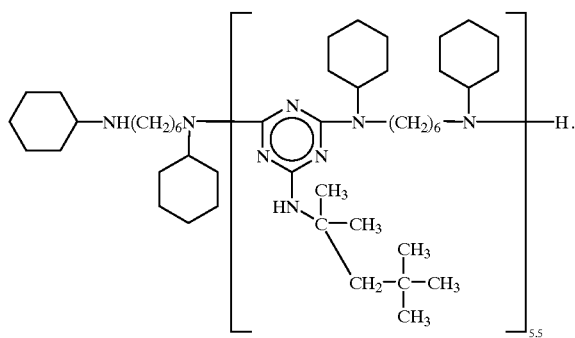
3. The compound of claim 1 comprising
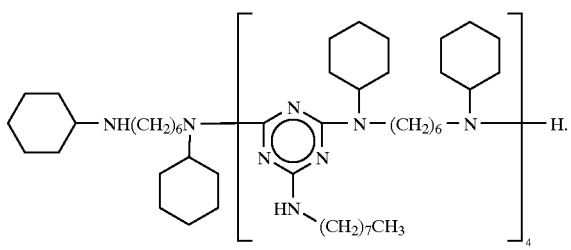
4. The compound of claim 1, wherein $R^2$ has 4 to 10 carbon atoms.
* * * * *

UNITED STATES PATENT AND TRADEMARK OFFICE
CERTIFICATE OF CORRECTION

PATENT NO. : 6,268,495 B1
DATED : July 31, 2001
INVENTOR(S) : Alan D. Rousseau et al.

Page 1 of 1

It is certified that error appears in the above-identified patent and that said Letters Patent is hereby corrected as shown below:

Column 2,
Line 5, after "electret" insert -- material for a dust filter which is a blend of an insulating polymer with a fatty acid --.

Column 9,
Line 60, "ohm.cm" should read as -- ohm·cm --.
Line 67, "trapping" should read as -- trapped --.

Column 10,
Line 46, after "accept" insert -- and hold --.
Line 66, the following paragraph is missing and should be inserted -- Sorbent particulate material such as activated carbon or alumina may also be included in the web. Such particles may be present in amounts up to about 80 volume percent of the contents of the web. Such particle-loaded webs are described, for example, in U.S. Pat. No. 3,971,373 (Braun), U.S. Pat. No. 4,100,324 (Anderson) and U.S. Pat. No. 4,429,001 (Kolpin et al.), which are incorporated herein by reference. --

Column 24,
Line 66, after "straight" insert -- chain --.

Signed and Sealed this

Second Day of April, 2002

*Attest:*

JAMES E. ROGAN
*Director of the United States Patent and Trademark Office*

*Attesting Officer*